(12) United States Patent
Wayda et al.

(10) Patent No.: US 8,990,153 B2
(45) Date of Patent: Mar. 24, 2015

(54) PULL DATA REPLICATION MODEL

(75) Inventors: James George Wayda, Laguna Nigel, CA (US); Kent Lee, Ladera Ranch, CA (US); Elizabeth G. Rodriguez, Vista, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 2620 days.

(21) Appl. No.: 11/561,680

(22) Filed: Nov. 20, 2006

(65) Prior Publication Data

US 2007/0185973 A1 Aug. 9, 2007
US 2011/0072104 A2 Mar. 24, 2011

Related U.S. Application Data

(60) Provisional application No. 60/771,384, filed on Feb. 7, 2006.

(51) Int. Cl.
*G06F 17/30* (2006.01)
*H04L 29/08* (2006.01)
*G06F 3/06* (2006.01)
*H04L 29/06* (2006.01)
*G06F 11/16* (2006.01)

(52) U.S. Cl.
CPC .......... *H04L 67/1095* (2013.01); *G06F 3/0607* (2013.01); *G06F 3/065* (2013.01); *G06F 3/0659* (2013.01); *G06F 3/067* (2013.01); *G06F 11/1662* (2013.01); *H04L 69/24* (2013.01)
USPC .......................................... 707/610; 707/639

(58) Field of Classification Search
USPC ................ 707/611, 999.2, 999.204, 999.202, 707/999.203, 999.103, 610, 639
See application file for complete search history.

(56) References Cited

U.S. PATENT DOCUMENTS

| 5,551,046 A | 8/1996 | Mohan et al. |
| 5,778,189 A | 7/1998 | Kimura et al. |
| 5,812,843 A | 9/1998 | Yamazaki et al. |
| 5,963,962 A | 10/1999 | Hitz et al. |

(Continued)

FOREIGN PATENT DOCUMENTS

| CA | 2165912 | 6/1997 |
| EP | 1003103 | 5/2000 |

(Continued)

OTHER PUBLICATIONS

International Preliminary Report on Patentability and Written Opinion from the PCT dated Oct. 22, 2009 with regard to corresponding PCT Application No. PCT/US/08/57326, 10 pages.

(Continued)

*Primary Examiner* — Apu Mofiz
*Assistant Examiner* — Fariborz Khoshnoodi
(74) *Attorney, Agent, or Firm* — Thomas J. Lavan; Matthew R. Ellsworth (57) ABSTRACT

A data storage system, device, and method are provided for replicating data between different data storage systems or appliances. More specifically, the present invention affords communications between heterogeneous data storage systems that potential employ different communication protocols. A bridging communication protocol is utilized by one or both storage systems in order to accommodate different communication protocols. Alternatively, a storage appliance connecting the data storage systems may employ the bridging communication protocol.

20 Claims, 8 Drawing Sheets

(56) References Cited

U.S. PATENT DOCUMENTS

| | | | |
|---|---|---|---|
| 6,073,209 A | 6/2000 | Bergsten et al. | |
| 6,076,148 A | 6/2000 | Kedem | |
| 6,289,356 B1 | 9/2001 | Hitz et al. | |
| 6,292,808 B1 | 9/2001 | Obermarck et al. | |
| 6,341,341 B1 | 1/2002 | Grummon et al. | |
| 6,548,634 B1 | 4/2003 | Balinger et al. | |
| 6,557,079 B1 | 4/2003 | Mason, Jr. et al. | |
| 6,594,744 B1 | 7/2003 | Humlicek et al. | |
| 6,615,223 B1 | 9/2003 | Shih et al. | |
| 6,711,409 B1 | 3/2004 | Zavgren et al. | |
| 6,771,843 B1 | 8/2004 | Huber et al. | |
| 6,792,518 B2 | 9/2004 | Armangau et al. | |
| 6,907,512 B2 | 6/2005 | Hill et al. | |
| 7,047,380 B2 | 5/2006 | Tormasov et al. | |
| 7,050,457 B2 | 5/2006 | Erfurt et al. | |
| 7,100,089 B1 | 8/2006 | Phelps | |
| 7,165,156 B1 | 1/2007 | Cameron et al. | |
| 7,191,304 B1 | 3/2007 | Cameron et al. | |
| 7,194,550 B1 | 3/2007 | Chamdani et al. | |
| 7,206,961 B1 | 4/2007 | Mutalik et al. | |
| 7,243,157 B2 | 7/2007 | Levin et al. | |
| 7,313,581 B1 | 12/2007 | Bachmann et al. | |
| 7,363,444 B2 | 4/2008 | Ji et al. | |
| 7,373,366 B1 | 5/2008 | Chatterjee et al. | |
| 7,426,618 B2 | 9/2008 | Vu et al. | |
| 7,526,640 B2 | 4/2009 | Bejarano et al. | |
| 7,593,973 B2 | 9/2009 | Lee et al. | |
| 2001/0039629 A1 | 11/2001 | Feague et al. | |
| 2002/0083037 A1 | 6/2002 | Lewis et al. | |
| 2002/0091670 A1 | 7/2002 | Hitz et al. | |
| 2002/0099907 A1 | 7/2002 | Castelli et al. | |
| 2002/0112084 A1 | 8/2002 | Deen et al. | |
| 2003/0154314 A1 | 8/2003 | Mason et al. | |
| 2003/0158863 A1 | 8/2003 | Haskin | |
| 2003/0167380 A1 | 9/2003 | Green | |
| 2003/0188223 A1 | 10/2003 | Alexis et al. | |
| 2003/0191745 A1 | 10/2003 | Jiang | |
| 2003/0229764 A1 | 12/2003 | Ohno et al. | |
| 2004/0030727 A1 | 2/2004 | Armangau | |
| 2004/0030846 A1 | 2/2004 | Armengau | |
| 2004/0030951 A1 | 2/2004 | Armangau | |
| 2004/0034647 A1* | 2/2004 | Paxton et al. | 707/102 |
| 2004/0054131 A1 | 3/2004 | Balinger et al. | |
| 2004/0093555 A1 | 5/2004 | Therrien et al. | |
| 2004/0117567 A1 | 6/2004 | Lee et al. | |
| 2004/0133718 A1 | 7/2004 | Kodama et al. | |
| 2004/0172509 A1 | 9/2004 | Takeda et al. | |
| 2004/0204071 A1 | 10/2004 | Bahl | |
| 2004/0260673 A1 | 12/2004 | Hitz et al. | |
| 2004/0267836 A1 | 12/2004 | Armangau et al. | |
| 2005/0004979 A1 | 1/2005 | Berkowitz et al. | |
| 2005/0044088 A1 | 2/2005 | Lindsay et al. | |
| 2005/0065985 A1 | 3/2005 | Tummala et al. | |
| 2005/0066095 A1 | 3/2005 | Mullick et al. | |
| 2005/0066128 A1 | 3/2005 | Yagisawa et al. | |
| 2005/0071393 A1* | 3/2005 | Ohno et al. | 707/204 |
| 2005/0122791 A1 | 6/2005 | Hajeck | |
| 2005/0138312 A1* | 6/2005 | Kubo et al. | 711/162 |
| 2005/0166022 A1 | 7/2005 | Watanabe | |
| 2005/0182910 A1 | 8/2005 | Stager et al. | |
| 2005/0193180 A1 | 9/2005 | Fujibayashi et al. | |
| 2005/0198452 A1 | 9/2005 | Watanabe | |
| 2005/0240635 A1 | 10/2005 | Kapoor | |
| 2005/0246397 A1 | 11/2005 | Edwards et al. | |
| 2005/0246503 A1 | 11/2005 | Fair | |
| 2006/0020762 A1* | 1/2006 | Urmston | 711/162 |
| 2006/0053139 A1 | 3/2006 | Marzinski et al. | |
| 2006/0064541 A1 | 3/2006 | Kano et al. | |
| 2006/0107006 A1 | 5/2006 | Green et al. | |
| 2006/0155946 A1 | 7/2006 | Ji | |
| 2006/0212481 A1 | 9/2006 | Stacey et al. | |
| 2006/0271604 A1 | 11/2006 | Shoens | |
| 2007/0011137 A1 | 1/2007 | Kodama | |
| 2007/0038703 A1 | 2/2007 | Tendjoukian | |
| 2007/0055710 A1 | 3/2007 | Malkin et al. | |
| 2007/0094466 A1 | 4/2007 | Sharma et al. | |
| 2007/0100808 A1 | 5/2007 | Balogh | |
| 2007/0143563 A1 | 6/2007 | Pudipeddi et al. | |
| 2007/0186001 A1 | 8/2007 | Wayda et al. | |
| 2007/0198605 A1 | 8/2007 | Saika | |
| 2007/0266066 A1 | 11/2007 | Kapoor et al. | |
| 2007/0276885 A1 | 11/2007 | Valiyaparambil | |
| 2008/0072003 A1 | 3/2008 | Vu et al. | |
| 2008/0082593 A1 | 4/2008 | Komarov et al. | |
| 2008/0114951 A1 | 5/2008 | Lee | |
| 2008/0177954 A1 | 7/2008 | Lee | |
| 2008/0177957 A1 | 7/2008 | Lee | |
| 2008/0256141 A1 | 10/2008 | Wayda et al. | |
| 2008/0256311 A1 | 10/2008 | Lee | |
| 2008/0281875 A1 | 11/2008 | Wayda et al. | |
| 2008/0281877 A1 | 11/2008 | Wayda et al. | |
| 2008/0320258 A1 | 12/2008 | Wayda et al. | |

FOREIGN PATENT DOCUMENTS

| | | |
|---|---|---|
| WO | WO9429807 | 12/1994 |
| WO | WO 0250716 | 6/2002 |
| WO | WO2005111773 | 11/2005 |
| WO | WO2005111802 | 11/2005 |

OTHER PUBLICATIONS

Office Action in U.S. Appl. No. 11/561,512, Dec. 10, 2009.
Official Action for U.S. Appl. No. 11/747,109, mailed Dec. 14, 2009.
Official Action for U.S. Appl. No. 11/747,127, mailed Jan. 6, 2010.
Official Action for U.S. Appl. No. 11/624,565, mailed Nov. 30, 2009.
Official Action for U.S. Appl. No. 11/561,512, Mar. 18, 2010.
Official Action for U.S. Appl. No. 11/945,940, mailed Mar. 5, 2010.
Official Action for U.S. Appl. No. 11/747,109, mailed Mar. 30, 2010.
Official Action for U.S. Appl. No. 11/624,524, mailed Jan. 26, 2010.
Notice of Allowance for U.S. Appl. No. 11/734,081, mailed Feb. 2, 2010.
Notice of Allowance for U.S. Appl. No. 11/734,081, mailed Mar. 10, 2010.
Office Action in U.S. Appl. No. 11/779,965, Jan. 29, 2010.
Written Opinion from the PCT dated Mar. 27, 2007 with regard to corresponding PCT Application No. PCT/US/06/32506, 10 pages.
International Search Report from the PCT dated Mar. 27, 2007 with regard to corresponding PCT Application No. PCT/US/06/32506, 3 pages.
Notice of Allowance for U.S. Appl. No. 11/747,127, mailed May 14, 2010.
Notice of Allowance for U.S. Appl. No. 11/747,127, mailed Jun. 2, 2010.
Notice of Allowance for U.S. Appl. No. 11/747,127, mailed Jun. 15, 2010.
Official Action for U.S. Appl. No. 11/768,127, mailed Apr. 2, 2010.
Official Action for U.S. Appl. No. 11/768,127, mailed Jun. 1, 2010.
Notice of Allowance for U.S. Appl. No. 11/945,940, mailed Jun. 18, 2010.
Official Action for U.S. Appl. No. 11/561,512, mailed Jun. 25, 2009.
Office Action in U.S. Appl. No. 11/561,512, Apr. 3, 2009, 11 pages.
Notice of Allowance for U.S. Appl. No. 11/560,174, mailed Feb. 9, 2009.
Notice of Allowance for U.S. Appl. No. 11/560,174, mailed Sep. 5, 2008.
Official Action for U.S. Appl. No. 11/624,524, mailed Dec. 11, 2008.
Official Action for U.S. Appl. No. 11/624,524, mailed Jun. 16, 2009.
Official Action for U.S. Appl. No. 11/624,565, mailed Mar. 30, 2009.
Official Action for U.S. Appl. No. 11/747,109, mailed Mar. 9, 2009.
Official Action for U.S. Appl. No. 11/734,081, mailed May 8, 2009.
Examiner's answer in U.S. Appl. No. 11/561,512, Sep. 2, 2010.
Notice of Allowance for U.S. Appl. No. 11/945,940, mailed Jul. 13, 2010.
Notice of Allowance for U.S. Appl. No. 11/747,127, mailed Jul. 13, 2010.
Notice of Allowance for U.S. Appl. No. 11/624,565, mailed Sep. 14, 2010.
Examiner's answer for U.S. Appl. No. 11/624,524, mailed Sep. 10, 2010.
Official Action for U.S. Appl. No. 12/780,891, mailed Sep. 20, 2010.

(56) References Cited

OTHER PUBLICATIONS

Office Action in U.S. Appl. No. 11/779,965, Jun. 24, 2010.
International Preliminary Report on Patentability and Written Opinion from the PCT dated Mar. 20, 2008 with regard to corresponding PCT Application No. PCT/US/06/32506, 10 pages.
Notice of Allowance in U.S. Appl. No. 11/277,738, Mar. 20, 2008, 6 pages.
Office Action in U.S. Appl. No. 11/277,738, Dec. 6, 2007, 9 pages.
Office Action in U.S. Appl. No. 11/277,738, Jul. 31, 2007, 8 pages.
Office Action in U.S. Appl. No. 11/277,738, Apr. 3, 2007, 14 pages.
Analysis from foreign associate dated Oct. 22, 2009 from 1st office action from Chinese patent office for application 200680032724.8.
Office Action in U.S. Appl. No. 11/561,512, Oct. 30, 2009, 9 pages.
Official Action for U.S. Appl. No. 11/747,109, mailed Sep. 21, 2009.
Official Action for U.S. Appl. No. 11/747,127, mailed Oct. 6, 2009.
Official Action for U.S. Appl. No. 11/624,524, mailed Sep. 16, 2009.
Official Action for U.S. Appl. No. 11/734,081, mailed Aug. 21, 2009.
Office Action in U.S. Appl. 11/561,512, Apr. 3, 2009, 11 pages.
Official Action for U.S. Appl. No. 11/747,127, mailed Apr. 15, 2009.
International Search Report from the PCT dated Aug. 7, 2008 with regard to corresponding PCT Application No. PCT/US/08/57326, 2 pages.
Written Opinion from the PCT dated Aug. 7, 2008 with regard to corresponding PCT Application No. PCT/US/08/57326, 6 pages.
Notice of Allowance for U.S. Appl. No. 11/624,565, mailed Sep. 29, 2010.
Official Action in U.S. Appl. No. 11/768,127, mailed Nov. 3, 2010.
Office Action in U.S. Appl. No. 11/779,965, Dec. 16, 2010.
Notice of Allowance for U.S. Appl. No. 11/747,109, mailed Jul. 11, 2011.
Official Action for U.S. Appl. No. 12/780,891, mailed Sep. 29, 2011.
Notice of Allowance for U.S. Appl. No. 11/779,965, mailed May 16, 2011.
Official Action for U.S. Appl. No. 11/747,109, mailed Mar. 18, 2011.
Notice of Allowance for U.S. Appl. No. 11/747,109, mailed Apr. 29, 2011.
Official Action for U.S. Appl. No. 12/780,891, mailed Mar. 25, 2011.
Notice of allowance for U.S. Appl. No. 11/768,127, mailed Apr. 18, 2012.
Notice of Allowance for U.S. Appl. No. 12/780,891, mailed Apr. 26, 2012.
Notice of Allowance for U.S. Appl. No. 11/624,524, mailed Apr. 22, 2014.
Official Action for U.S. Appl. No. 12/540,243, mailed Jul. 19, 2013.
Official Action for U.S. Appl. No. 12/540,243, mailed Dec. 17, 2012.
Official Action for U.S. Appl. No. 12/540,243, mailed Sep. 6, 2012.
Official Action for U.S. Appl. No. 11/768,127, mailed Dec. 28, 2011.
Official Action for U.S. Appl. No. 12/540,243, mailed Feb. 2, 2012.

* cited by examiner

PULL DATA REPLICATION MODEL

CROSS REFERENCE TO RELATED APPLICATIONS

This Application claims the benefit of U.S. Provisional Application No. 60/771,384, filed Feb. 7, 2006, the entire disclosure of which is hereby incorporated herein by reference. Also, this application is related to U.S. patent application Ser. No. 11/561,512, filed Nov. 20, 2006, entitled Data Replication Method and Apparatus.

FIELD

The present invention is directed to data replication. In particular, the present invention is directed to methods and apparatuses for replicating data between different data storage systems or appliances.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often desirable to maintain different versions of a data storage volume. Indeed, data storage systems are available that can provide at least limited data archiving through backup facilities and/or snapshot facilities. These facilities can comprise automated or semi-automated batch replication facilities. By maintaining different versions, disaster recovery is facilitated. For example, if a virus causes a current storage volume version to be lost or otherwise unusable, the system can be rolled back to an earlier version that does not include the file that introduced the virus. In order to further facilitate the use and security of data, it is often desirable to create a copy of a data storage volume that is originally maintained by a first data storage system on a second data storage system. However, creating backup copies or snapshots of a first data storage system on a second data storage system, commonly referred to as remote replication, introduces complications. In particular, a data storage system that is the source of the data that is to be replicated must act as an initiator device in order to move the data to the recipient data storage system that is acting as the target. However, data storage systems typically are targets, not initiators. Furthermore, an initiator is a more complex and difficult to implement function, requiring more intelligence and processing power to implement as compared to a typical target device. Accordingly, in order for a source data storage system to perform data replication in cooperation with a remote data storage system, the source data storage system must typically be enhanced to include initiator functions, as well as remote replication functions.

Data replication between different storage systems is further complicated where the initiator and the target data storage systems are from different data storage system vendors. This is because different vendors typically use different protocols and instructions to control operation of their data storage systems. As a result, the automated or semi-automated batch replication of data between data storage systems from different vendors is at best difficult, and is often impossible.

SUMMARY

The present invention is directed to solving these and other problems and disadvantages of the prior art. In accordance with embodiments of the present invention, a remote batch data replication service is provided that consists of asynchronous replication of data between a local and a remote system through the use of snapshots. In one embodiment, the remote batch data replication service features asynchronous replication of block-level data from a volume at a local data storage system to a remote data storage system. More particularly, in a pull data replication model, the local or source data storage system is able to operate as a target device. In accordance with still other embodiments of the present invention, the source and remote data storage systems can exchange information regarding their respective capabilities, and can use a common protocol to enable data replication even where the data storage systems are from different vendors (i.e. they are heterogeneous systems).

In order to allow a source data storage system to operate as a target device while replicating data to a remote or destination data storage system, the destination data storage system operates to pull data from the source data storage system. Pulling data can include making use of data snapshot capabilities native to the source data storage system. In accordance with embodiments of the present invention, the destination data storage system commands the source data storage system to take a first snapshot of the storage volume that is to be replicated. The source data storage system is also instructed to make the first snapshot visible to the destination data storage system, and the destination data storage system makes a copy of the data contained in the first snapshot. That is, the destination data storage system copies the complete data storage volume. The destination data storage system copies all of the blocks from the first snapshot and then the destination takes a snapshot. The destination data storage system thereafter commands the source storage system to take another snapshot, and requests a list of the data block numbers that have changed. A copy of the changed data blocks is then requested from the source data storage system by the destination data storage system. By copying only the changed data blocks, a complete backup copy of the replicated storage volume can be maintained on the destination data storage system, without requiring copying the complete storage volume at each update of the backup copy. Furthermore, embodiments of the present invention do not require that the source data storage system have the additional intelligence and features required to operate as an initiator. Instead, the source data storage system can operate as a target by responding to commands initiated by the destination data storage system, or by some other initiator.

In accordance with further embodiments of the present invention, data replication and other features can be performed between heterogeneous data storage systems using a heterogeneous communication protocol. The heterogeneous communication protocol provides a bridge between data storage systems from different vendors, and allows heterogeneous data storage systems to advertise and discover their respective data replication capabilities. In order to implement the heterogeneous communication or bridging protocol, the vendors of different data storage systems each use a common replication protocol. In accordance with embodiments of the present invention, in response to a query by a remote data storage system using the heterogeneous communication protocol, a source data storage system can be instructed to advertise or otherwise provide information regarding its capabilities to the remote data storage system. It should be noted that the remote data storage system could also be commanded to provide information regarding its capabilities. Furthermore, data replication between heterogeneous data storage systems can be performed with the source data storage system operating as a target. Although embodiments implementing a heterogeneous communication protocol allow replication of data from a source data storage system operating as a target device to a remote data storage system operating as an initiator, it should be appreciated that the heterogeneous communication protocol can support other types of communications between heterogeneous data storage systems. For example, the heterogeneous replication protocol provides for data replication in either direction between two storage systems from the same or different vendors.

In one embodiment, a simple heterogeneous replication protocol is a simple remote data replication protocol that provides the capability for systems that do not inherently implement remote data replication to perform remote data replication with another system as both a source and target of replication data. Simple heterogeneous replication protocol may be implemented as a cross-vendor/cross platform protocol. The system that does not inherently implement remote data replication implements snapshot capability and provides the ability to map a newly created snapshot to a Logical Unit Number (LUN) or other type of mechanism defined in the protocol capable of getting the data. The system also implements simple heterogeneous replication protocol such that a partner system can query data management services capabilities (e.g., SHRP, snapshot, split mirror, replication, etc.) and issue commands to control the snapshot services in order to facilitate asynchronous batch (snapshot based) replication.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a storage volume. The data is essentially frozen in time at the instant that the snapshot is taken. Although data on the storage volume may change as a result of write operations, the data represented by the snapshot will remain constant and frozen in time at the instant that the snapshot was taken. In order to preserve snapshot data, a repository is used to store data that is not otherwise represented in the storage volume and snapshot metadata. All data and metadata associated with the snapshot is stored in the repository, although such storage on the repository is not required. In accordance with embodiments of the present invention, data stored within the snapshot is stored in "chunks." A chunk is equivalent to a number of logical data blocks (LBAs). As a further optimization, data may also be stored at a subchunk level. A subchunk is a fixed size subset of a chunk. Accordingly, data can be moved between data storage systems 104, 108 in units of chunks, subchunks, or any multiple thereof. The units that are used for data replication operations can be selected to optimize the performance of the network link between the data storage systems.

Figure 1:
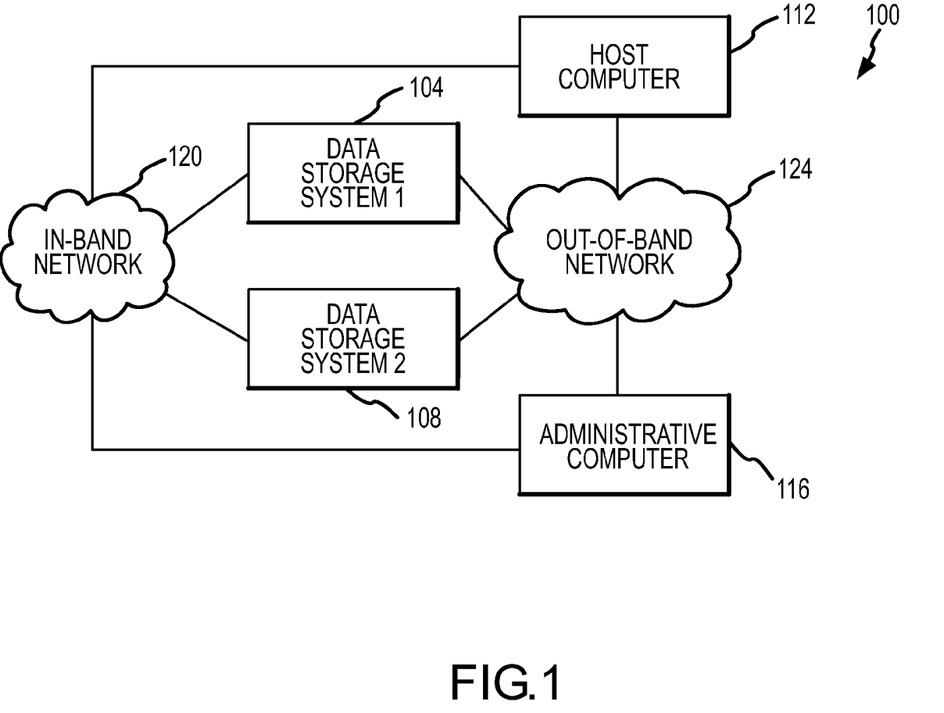
FIG. 1 is a functional block diagram depicting components of an electronic data system incorporating a source data storage system and a remote data storage system in accordance with embodiments of the present invention.

FIG. 1 is a block diagram depicting an electronic data system 100 in accordance with embodiments of the present invention incorporating a first data storage system 104 and a second data storage system 108. The electronic data system 100 may also include one or more host processors, computers or computer systems 112. In addition, the electronic data system 100 may include or may be interconnected to an administrative computer 116. As will be appreciated by one of skill in the art after consideration of the present disclosure, embodiments of the present invention have applications in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, in a typical remote replication environment, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host devices 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network may provide the potential for globally or other widely distributed management or globally distributed remote replication between data storage systems 104, 108 via TCP/IP.

Every electronic data system node or computer 104, 108, 112 and 116, need not be interconnected to every other node or device through both the in-band network 120 and the out-of-band network 124. For example, no host device 112 needs to be interconnected to any other host device 112, data storage system 104, 108, or administrative computer 116 through the out-of-band communication network 124, although interconnections between a host device 112 and other devices 104, 108, 116 through the out-of-band communication network 124 are not prohibited. As another example, an administrative computer 116 may be interconnected to at least one storage resource device 104 or 108 through the out-of-band communication network 124. An administrator computer 116 may also be interconnected to the in-band network 120 directly, although such an interconnection is not required. For example, instead of a direct connection, an administrator computer 116 may communicate using the in-band network 120 to a controller of a data storage system 104, 108.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although only two data storage systems 104, 108 are shown in FIG. 1, an electronic data system 100 may include more than two data storage systems.

Figure 2A:
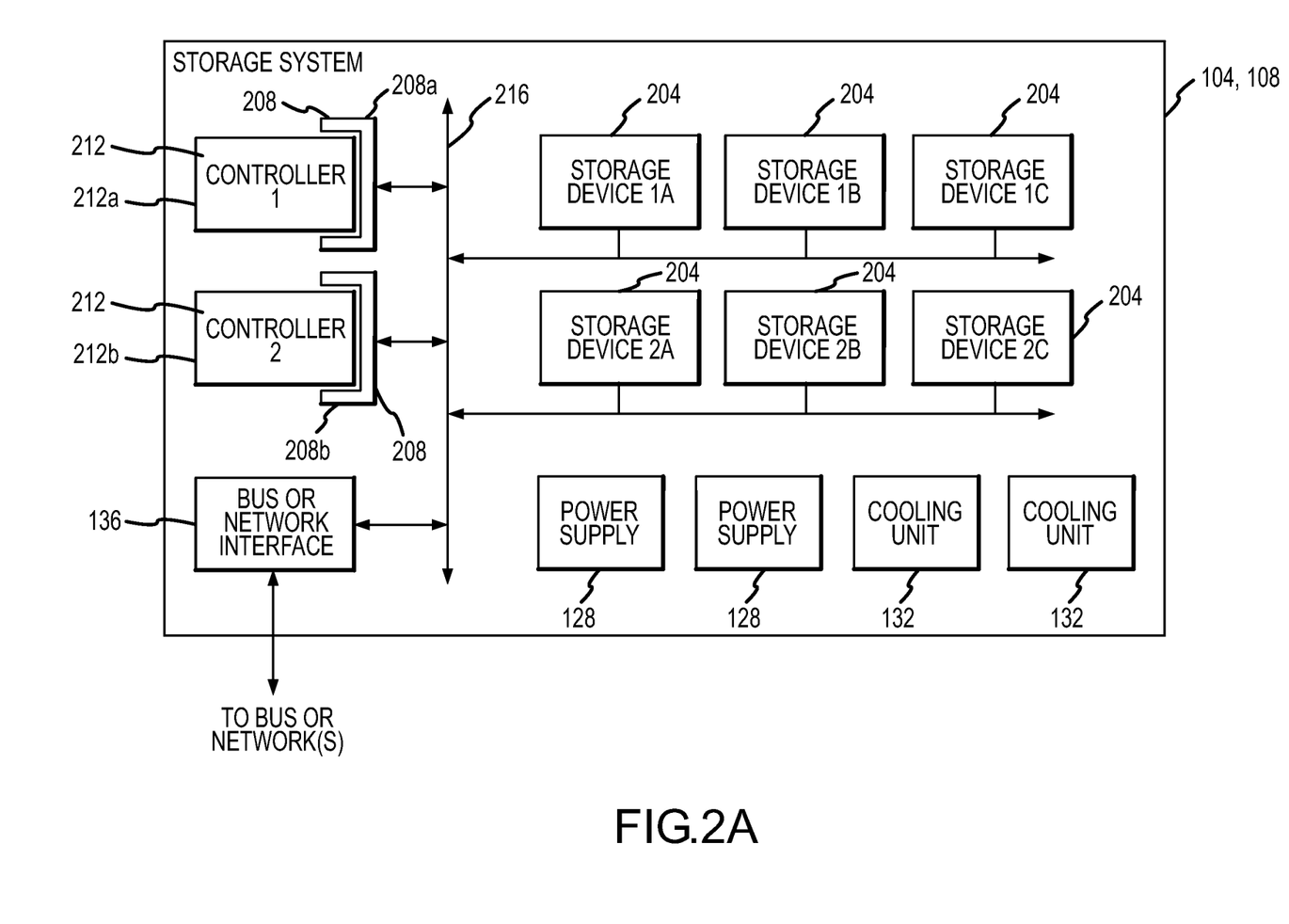
FIG. 2A is a block diagram depicting components of a data storage system in accordance with embodiments of the present invention.

FIG. 2A illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid state disk devices. Furthermore, although a number of storage devices 204 are illustrated, it should be appreciated that embodiments of the present invention are not limited to any particular number of storage devices, and that a lesser or greater number of storage devices 204 may be provided as part of a data storage system 104. As can be appreciated by one of skill in the art, one or more arrays and/or array partitions, hereinafter referred to as logical unit numbers (LUNs) comprising a storage volume, may be established on the data storage devices 204. As used herein, an array is understood to refer to a RAID set and the array partition. It can be appreciated that some subset of the array partition can be represented as a single unit to a host. As can be further appreciated by one of skill in the art, a LUN may be implemented in accordance with any one of the various array levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. As can also be appreciated by one of skill in the art, the storage devices 204 contain data comprising a master storage volume, which may correspond to a LUN, and one or more snapshots. In one embodiment, the snapshots may be mapped to the LUNs.

A data storage system 104, 108 in accordance with embodiments of the present invention may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller. As can be appreciated by one of skill in the art, the provision of two controllers, 212a to 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 128 and one or more cooling units 132. In addition, a bus or network interface 136 may be provided to interconnect the data storage system 104, 108 to the bus or network 112, and/or to a host computer 108 or administrative computer 116.

Figure 2B:
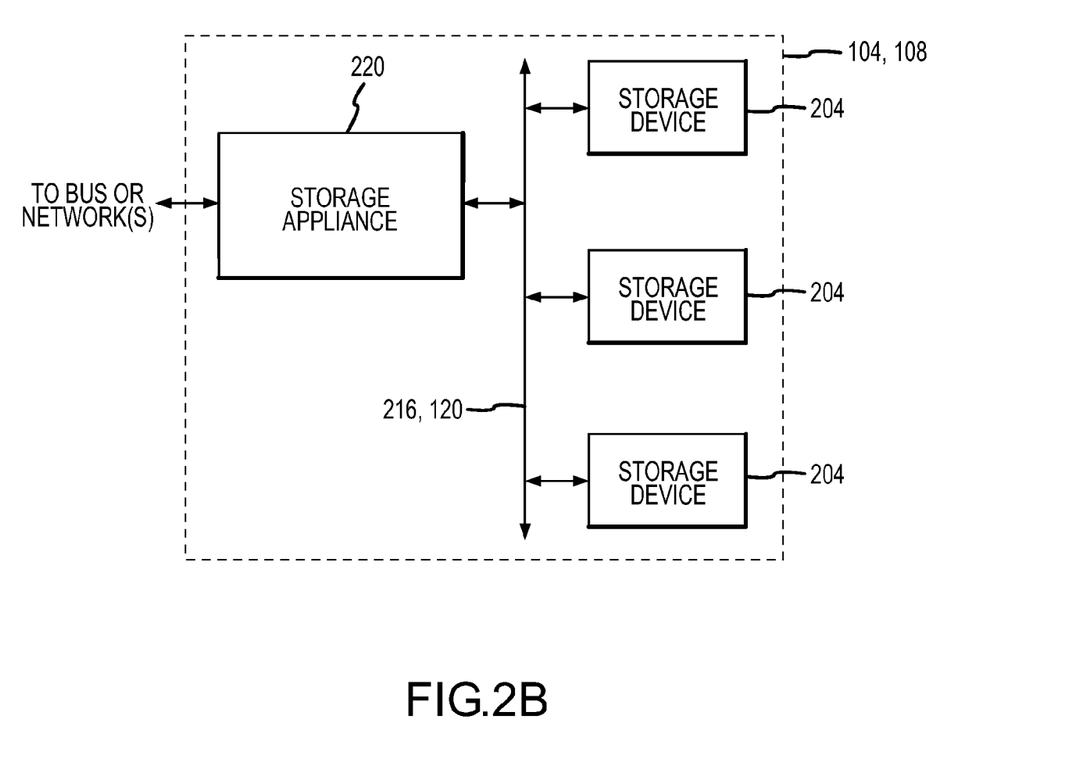
FIG. 2B is a block diagram depicting components of a data storage system in accordance with other embodiments of the present invention.

Although illustrated as a complete RAID system in FIG. 2B, it should be appreciated that the data storage system 104 can comprise one or more storage volumes implemented in various other ways. For example, the data storage system 104 may comprise a hard disk drive or other storage device 204 connected or associated with a server or a general purpose computer. As further examples, the storage system 104 may comprise a Just a Bunch of Disks (JBOD) system or a Switched Bunch of Disks (SBOD) system.

With reference to FIG. 2B, components that may be included in a data storage system 104, 108 in accordance with other embodiments of the present invention are illustrated. In general, the data storage system 104, 108 according to such embodiments includes a storage appliance 220 interconnecting one or more storage devices 204 to a bus or network. Furthermore, the storage appliance 220 may be inserted between a host 112 or other device and one or more storage devices 204. In accordance with still other embodiments of the present invention, a storage device 204 may itself comprise a collection of hard disk drives or other storage devices, for example provided as part of a RAID or SBOD system.

Figure 3A:
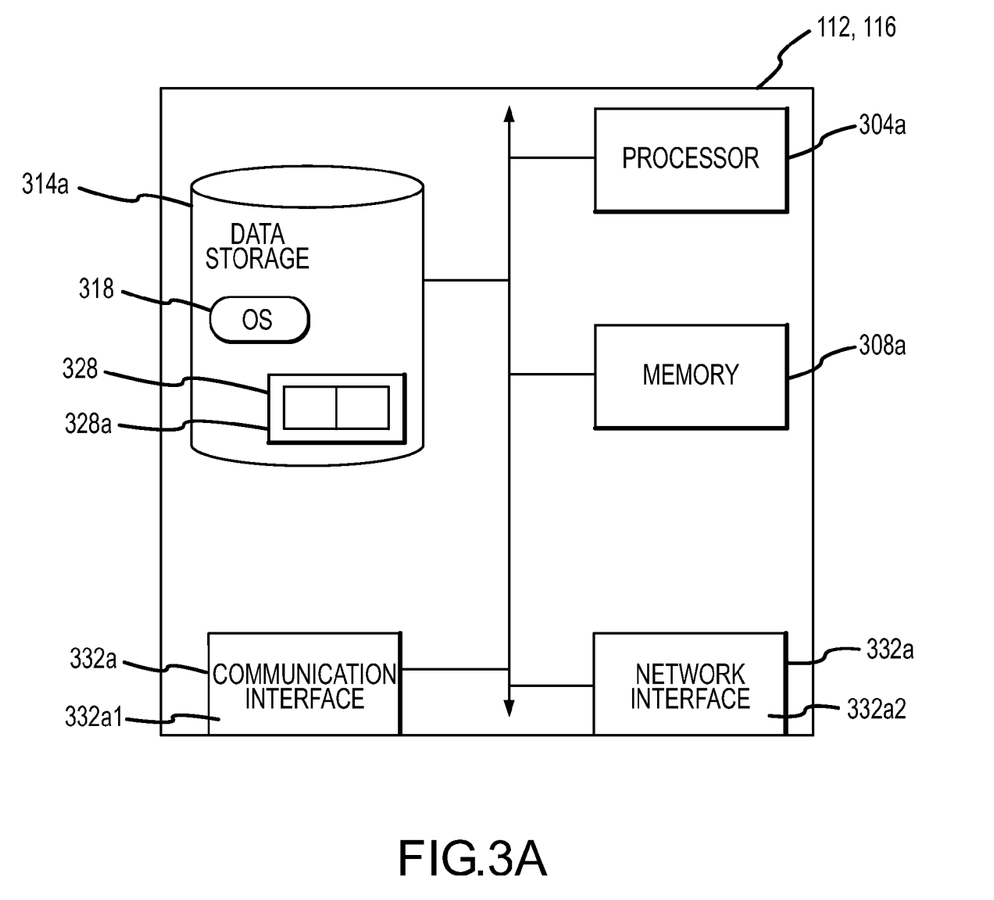
FIG. 3A is a block diagram depicting components of a storage appliance in accordance with embodiments of the present invention.

With reference to FIG. 3A, a storage appliance 220 in connection with an embodiment of the present invention in which at least some data replication establishment and management functions are provided by software running on the storage appliance 220 interconnecting one or more storage devices 204 to a host device 112 or other data storage systems 104, 108 is illustrated. The components may include a processor 304a capable of executing program instructions. Accordingly, the processor 304a may include any general purpose programmable processor or controller for executing application programming. Alternatively, the processor 304a may comprise a specially configured application specific integrated circuit (ASIC). The processor 304a generally functions to run programming code including a data replication application 328a.

The host 112 or the administrative 116 computer may additionally include memory 308a for use in connection with data replication applications. For example, the memory 308a may store a copy of the data replication application 328a configuration instructions. The memory 308a may comprise solid state memory resident, removable or remote in nature, such as FLASH, DRAM and/or SDRAM.

The host 112 or the administrative 116 computer may also include data storage 314a for the storage of application programming and or data. For example, operating system software 318 may be stored in the data storage 314a. In addition, the data storage 314a may be used to store a data replication application 328a comprising instructions for pulling data from a source data storage system 104 and providing the data to a destination storage volume 108 as described herein. The data replication application 328a may itself include a number of modules or components, such as a main input/output (IO) module and a restore thread or module.

The host 112 or the administrative 116 computer may also include one or more network interfaces 332a. For example, a first network interface 332a1 may interconnect the storage appliance to a host device 112 through a first network and a second network interface 332a may interconnect the storage appliances to the storage device or devices 204 that, together with the storage appliance 220, comprise a data storage system 104, 108. Furthermore, the first and second networks may be of the same type or different types, and the storage appliance 200 may be "inline" between a host device 112 and a storage device 204. Examples of a network interface 332a include a fiber channel (FC) interface, Ethernet, or any other type of communication interface. As can be appreciated by one of skill in the art, a network interface 332a may be provided in the form of a network interface card or other adapter.

Figure 3B:
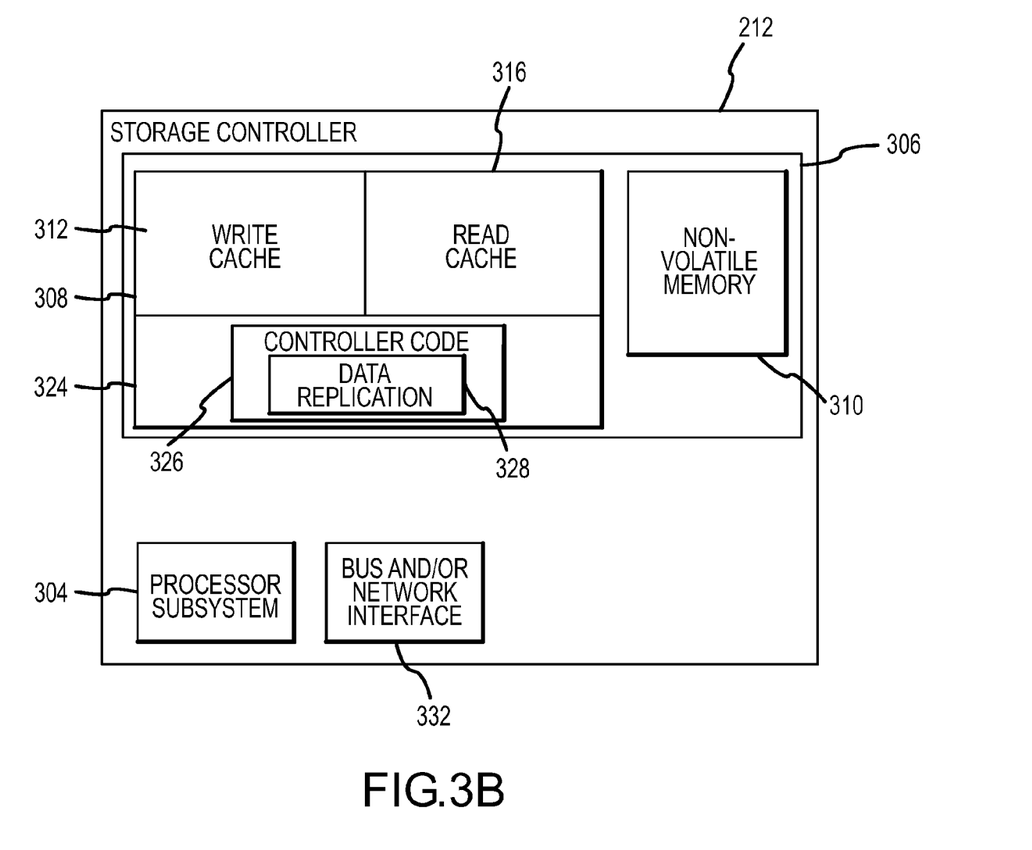
FIG. 3B is a block diagram depicting components of a storage controller in accordance with embodiments of the present invention.

FIG. 3B illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for implementing aspects of a snapshot restore method and apparatus. Furthermore, such instructions may be stored as software and/or firmware. As can be appreciated by one of skill in the art, operations concerning the generation of parity data or other operations may be performed using one or more hardwired and or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (LPLD).

A controller 212 also generally includes memory 306. The memory 306 is not specifically limited to memory of any particular type. For example, the memory 306 may comprise a solid state memory device, or a number of solid state memory devices. In addition, the memory 306 may include separate volatile memory 308 and non-volatile memory 310 portions. As can be appreciated by one of skill in the art, the memory 306 typically includes a write cache 312 and a read cache 316 that are provided as part of the volatile memory 308 portion of the memory 306, although other arrangements are possible. By providing caches 312, 316, a storage controller 212 can improve the speed of input/output (IO) operations between a host 108 and the data storage devices 204 comprising an array or array partition. Examples of volatile memory 308 include DRAM and SDRAM.

The non-volatile memory 310 may be used to store data that was written to the write cache 312 of memory 306 in the event of a power outage affecting the data storage system 104. The non-volatile memory portion 310 of the storage controller memory 306 may include any type of data memory device that is capable of retaining data without requiring power from an external source. Examples of non-volatile memory 310 include, but are not limited to, compact flash or other standardized non-volatile memory devices.

The memory 306 also includes portions of the memory 306 comprising a region 324 that provides storage for controller code 326. The controller code 326 may comprise a number of components, including a data replication process or application 328 comprising instructions for pulling data from a source data storage system as described herein. The data replication application 328 may itself include a number of modules or components, such as a main input/output (IO) module and a restore thread or module. As shown in FIG. 3B, the controller code region 324 may be established in a volatile memory 308 portion of the storage controller memory 306. Alternatively or in addition, controller code 326 may be stored in non-volatile memory 310.

A storage controller 212 may additionally include other components. For example, a bus and/or network interface 332 may be provided for operably interconnecting the storage controller 212 to the remainder of the data storage system 104, for example through a controller slot 208 and a bus or channel 216. Furthermore, the interface 332 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
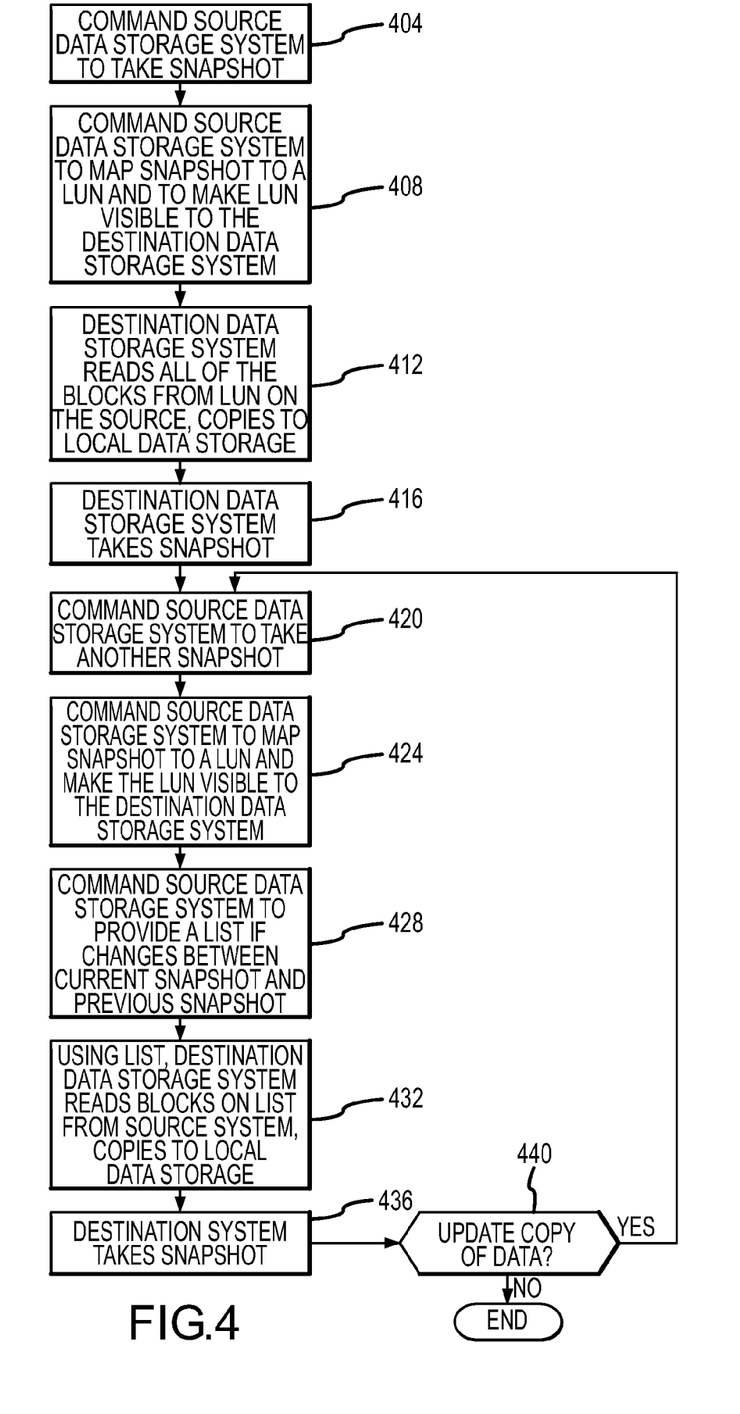
FIG. 4 is a flow chart depicting aspects of a data replication process in accordance with embodiments of the present invention.

With reference to FIG. 4, a process for replicating data stored on a source data storage system 104 to a destination data storage system 108, in which the source data storage system 104 has the attributes of a target device, are illustrated. Initially, at step 404, the destination data storage system 108 or a storage appliance (hereinafter referred to as the initiator) commands the source data storage system 104 to take a snapshot of the master storage volume maintained by the source data storage system 104 (or of some specified storage volume maintained by the source data storage system 104). As used herein, a snapshot is a virtual volume that represents the data that existed on the master storage volume at the point in time that the snapshot was taken. The master storage volume is the current set of data maintained on the source data storage system 104. The master storage volume may correspond to a standard RAID volume or LUN. The initiator then commands the source data storage system 104 to map the snapshot to a LUN and to make the LUN visible to the initiator (step 408). All of the blocks of data in the snapshot are then read by the destination data storage system 108 (or by another device acting as the initiator), and the data is copied to the destination data storage system (e.g., the second data storage system 108)(step 412). As can be appreciated by one of skill in the art after consideration of the present disclosure, copying the data to the destination storage system 108 generally comprises storing the data in data storage devices 204 that are local to or associated with the destination data storage system 108.

In accordance with at least one embodiment of the present invention, rather than transferring all data blocks from the source data storage system 104 to the destination data storage system 108, it may be possible to perform a hash operation on a range of blocks on the source data storage system 104 and the destination data storage system 108 in order to create as hash list. The hash list can then be transferred from the source data storage system 104 to the destination data storage system 108. If the hash key for a range of disk blocks on the source data storage system 104 is identical to the hash key for the same range of blocks on the destination data storage system 108, then it is not necessary to transfer the data blocks. The hash algorithm facilitates effective use of the bandwidth of the asynchronous link between the local and remote systems.

At step 416, the destination data storage system 108 takes a snapshot of the data copied from the source data storage system 104. Both data storage systems therefore have identical copies of data and a snapshot of the data from the same point in time after this step is completed. It should be noted that the same algorithm can be used to copy any volume, even if not snapped, so long as the source volume is not being written to during the copy. This results in a destination initiated volume copy.

At step 420, the initiator commands the source data storage system 104 to take another snapshot of the master storage volume. The initiator then commands the source data storage system 104 to map this snapshot to a LUN and to make the LUN visible to the destination data storage system 108 (step 424).

The initiator next commands the source data storage system 104 to provide a list of the changes (i.e. the delta data) between the current snapshot and the previous snapshot (step 428). Using the provided list, the initiator then reads the blocks in the list from the source system, and copies the data to the local data storage (step 432). The destination data storage system 108 then takes a snapshot of the data now stored in the local data storage (step 436). The source 104 and destination 108 data storage systems thus have identical snapshots or copies of the master data storage volume on the source data storage system 104, at the time the first snapshot was taken, and at the time the second snapshot was taken. If desired, earlier snapshots can be deleted from one or both of the data storage systems 104, 108, for example if it is considered unimportant to maintain a number of restore points for the master storage volume.

At step 440, a determination can be made as to whether the copy of the master storage volume on the destination storage device 108 should be updated. If it is determined that an update should be performed, the process may return to step 420. If no further updates are required, the process may end. In accordance with embodiments of the present invention, copies of the master storage volume are made periodically. For example, an updated copy of the master storage volume can be taken every 10 minutes.

As can be appreciated by one of skill in the art after consideration of the present disclosure, data can be replicated from a source data storage system 104, even if the source data storage system 104 does not provide native support for data replication to another data storage system 108. In addition, the source data storage system 104 does not need to act as an initiator in connection with replicating stored data. Instead, the source data system 104 can operate as a target device. In accordance with embodiments of the present invention where the source data storage system 104 is not an initiator, in order to provide data replication as described, the source data storage system 104 should be able to respond to commands to take snapshots, to map a snapshot to a LUN, and provide lists of LBAs that contain data (or changed data for subsequent copies). Furthermore, it can be appreciated that, following the transfer of the initial snapshot data comprising a complete copy of the data in the source's master storage volume, only the changed data needs to be transferred in order to establish an updated copy of the master storage volume on the destination storage device.

These commands necessary to perform data replication may be communicated using a simple communication protocol. In accordance with still other embodiments of the present invention, a simple bridging communication protocol may be provided that enables these and other functions to be performed between data storage systems 104, 108 from different vendors (i.e. between heterogeneous data storage systems). Accordingly, the simple bridging protocol may comprise a set of commands recognized by data storage system 104, 108 sourced from different vendors. The simple bridging protocol may be provided to different vendors, in order to facilitate communications necessary in order to replicate data or performing other functions or services, for example between heterogeneous data storage systems. As a further example, a destination data storage system 108 may communicate with a source communication system 104 that natively supports a different native communication protocol, in order to perform data replication as described herein. Therefore, a source data storage system 104 from a different vendor than the destination data storage system 108 need not be provided with any extra intelligence in order to provide data replication in cooperation with the destination data storage system 108, other than an ability to take snapshots and respond to commands expressed in the simple bridging protocol.

As can be appreciated by one of skill in the art after consideration of the present disclosure, the simple bridging protocol is not limited to use in connection with pulling data from a source data storage system 104 operating as a target. For example, the simple bridging protocol can be used to allow a source data storage system 104 to act as an initiator and the destination data storage system 108 to act as a target in connection with data replication operations. For instance, using the simple bridging protocol, the source data storage system 104 (operating as an initiator) replicates data to a volume on the destination storage system 108 and commands the destination storage system 108 (operating as a target) to take a snapshot of that volume.

Figure 5:
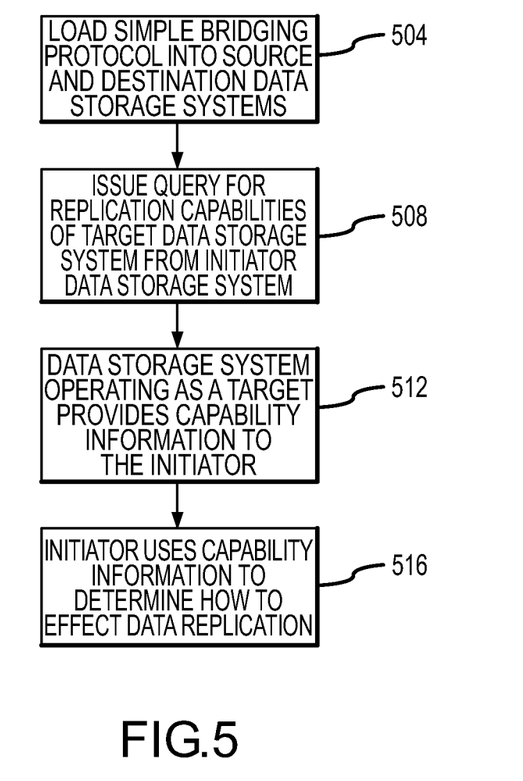
FIG. 5 is a flow chart depicting aspects of a process for exchanging information between heterogeneous data storage systems in accordance with embodiments of the present invention.

In accordance with embodiments of the present invention, and with reference to FIG. 5, a process for providing and using a simple bridging protocol comprises loading the protocol into a source data storage system 104 and into a destination storage system 108 (step 504). The protocol may be loaded onto the storage systems 104, 108 as a software plug-in or may already be resident within firmware of the data storage systems 104, 108. A query for replication capabilities is then issued by the data storage system 104 or 108 operating as an initiator to the data storage systems 104 or 108 operating as a target (step 508). Alternatively, the query may be issued by another initiator in the electronic data system 100. This query may be issued using the simple bridging protocol.

In response to the query, the data storage system 104 or 108 operating as a target device provides capability information (step 512). The capability information may comprise data storage system 104 or 108 data management services capabilities, such as snapshot capabilities, the ability to act as an initiator, remote data replication capabilities, storage volume naming capabilities, snapshot volume naming capabilities, storage volume mapping capabilities, snapshot volume mapping capabilities, etc. The data storage system 104 or 108 acting as the initiator, or some other initiator in the electronic data system 100, then uses the capability information to determine how to effect data replication between the source data storage system 104 and the destination data storage system 108 (step 516).

By providing or advertising capability information in response to a query, a system using the simple bridging protocol is not limited to any fixed set of features. Accordingly, as features are added to versions of a data storage system 104 or 108, those added features may be reported to the data storage systems 104 or 108 or other components of an electronic data storage system 100 and can be made available to those other components.

Figure 6:
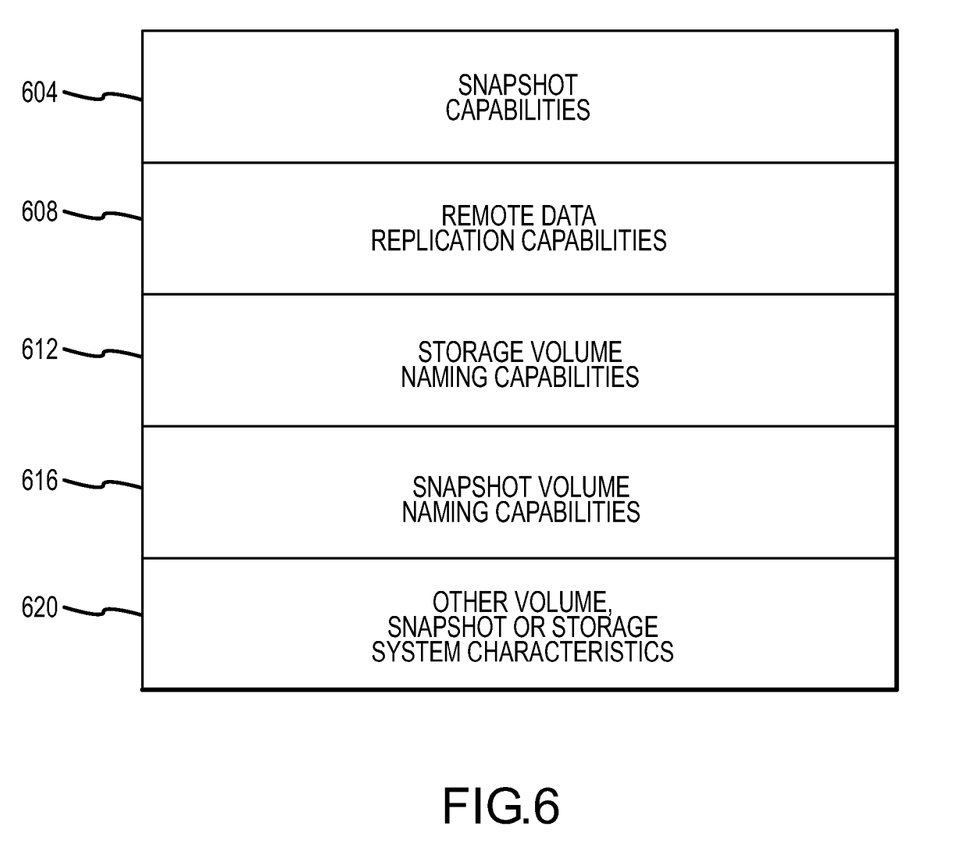
FIG. 6 depicts an exemplary data structure of a response to a destination storage system's query command in accordance with embodiments of the present invention.

FIG. 6 depicts an exemplary data structure of a response to a destination storage system's 108 query command in accordance with embodiments of the present invention. The response to a query command generally comprises, without limitation, snapshot capability information 604, remote data replication capability information 608, storage volume naming capability information 612, snapshot volume naming capability information 616, and other volume, snapshot and/or storage system characteristic information 620. When the destination data storage system 108 receives the information describing the source data storage system's 104 capabilities, the destination data storage system 108 can determine what types and methods of remote data replication can be employed to replicate data to/from the source data storage system 104.

The shapshot capability information 604 may include the number of supported snapshots for the entire storage system and/or on a per volume basis and how those snapshots are characterized. For example some snapshots may be fully allocated whereas other shapshots may be sparse snapshots and others may be both. Additionally, the snapshot capability information 604 may include snapshot naming formats for snapshots on the system.

Information included as a part of the remote data replication capabilities 608 may include, for example, whether remote replication is supported on the source data storage system 104, and if remote replication is supported what types of remote replication are supported (e.g., transactional asynchronous, batch asynchronous, synchronous, CDP, or any other type of data replication protocol known in the art). The remote data replication capability information 608 may further indicate whether the replying system is capably of acting as a remote replication target and/or as an initiator. This essentially indicates whether the replying system is enabled to operate in a target mode and/or an initiator mode. Additionally, the remote data replication capability information 608 may indicate what type of support the replying system has for a pull data replication model (if any). Also, the number of remote targets supported per storage volume and if remote replication chaining is supported may be included in the remote data replication capability information 608.

Storage volume naming capabilities 612 may include the protocol used to support volume naming, the maximum number of characters allowed in a storage volume name, the minimum number of characters allowed in a storage volume name, and so on. By providing storage volume naming capabilities 612, the destination data storage system 108 can name storage volumes as they would be named in the source data storage system 104, or at least be aware of the naming schemes in the source data storage system 104.

Similar to storage volume naming capabilities 612, the replying system may identify how snapshots are named by providing snapshot volume naming capabilities 616. The snapshot volume naming capabilities 616 may include, for instance, the maximum number of characters in a snapshot volume name, the minimum number of characters in a snapshot volume name, and any off limits characters in a snapshot volume name.

As can be appreciated by one of skill in the art, additional information may be provided by the replying system in the other volume, snapshot, and/or storage system characteristics information field 620. Data stored in this particular field may include, without limitation, storage system configuration information, the number of storage volumes in use, and any state information related to the storage system, volume, and/or snapshots.

As can be appreciated, any reliable communication protocol may be used as the bridging protocol to provide communication capabilities between storage systems 104, 108. The bridge communication protocol used between the storage systems 104, 108 in some embodiments may include Fibre Channel and/or iSCSI. The use of iSCSI as the bridge protocol may afford the use of SCSI Command Descriptor Blocks (CDBs) to transfer commands, data, and responses between storage systems 104, 108. The communication protocol, in one embodiment, is vendor specific and uses SCSI Send/Receive Diagnostics, Read/Write Buffer, and/or vendor specific SCSI operation codes. Of course, it is important to note that even though the protocol can be based upon SCSI, reliance on SCSI as a data transport mechanism is not a requirement of the present invention.

To perform remote replication in accordance with embodiments of the present invention, the destination data storage system 108 issues commands to a source data storage system 104 requesting the source data storage system 104 perform certain tasks (e.g., take snapshots, map snapshots to host LUNs, etc.). The source data storage system 104 responds to received commands, performs the requested tasks, and returns the appropriate response. The bridging protocol affords for communications between different types of storage systems. Command sets that may be included as a part of the bridging protocol include, but are not limited to, creating and naming of snapshots, deletion of snapshots, establishment of remote data replication characteristics/parameters, initiation and termination of remote data replication, naming of remote storage volumes, naming of remote snapshot volumes, mapping of remote storage volumes to a LUN, and mapping of remote snapshot volumes to a LUN.

The create and name a snapshot command is generally used by the destination data storage system 108 to request the source data storage system 104 to take a snapshot of the volume that is targeted during the replication process. The snapshot delete command is used to delete snapshots on the source data storage system 104 in order to free-up additional storage resources.

When the destination data storage system 108 issues a remote data replication characteristic/parameter command, it is essentially asking the source data storage system 104 to provide its replication characteristics, which will ultimately determine how the replication process will proceed between the storage systems 104, 108.

The initiation and termination commands are generally used by the destination data storage system 108 to specify that replication is starting or terminating at a particular source data storage system 104. Alternatively, the initiation and termination commands may be used to specify when the replication process should start/end.

Storage volume naming commands may be used by the destination data storage system 108 to name or change the name of a source data storage volume. Likewise, snapshot naming commands may be used by the destination data storage system 108 to name or change the name of a snapshot volume and may be included as a part of the storage volume naming command.

The command to map a storage volume to a LUN is generally used by the destination data storage system 108 to have the source data storage system 104 map a storage volume to a LUN. Similarly, the destination data storage system 108 may use a map snapshot volume to LUN command to have the source data storage system 104 map one or more snapshots to a LUN. Also, the map snapshot volume to LUN command may be included in the map storage volume to LUN command.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A method of reproducing data, comprising:
   sending a first command from an initiator storage system to a target storage system requesting the target storage system to take a first snapshot of data stored on the target storage system;
   sending a second command from the initiator storage system to the target storage system requesting the target storage system to make the first snapshot viewable to the initiator storage system; and
   copying at least a portion of data from the first viewable snapshot.

2. The method of claim 1, further comprising:
   sending a third command from the initiator storage system to the target storage system requesting the target storage system to take a second snapshot of data stored on the target storage system;
   sending a fourth command from the initiator storage system to the target storage system requesting the target storage system to make the second snapshot viewable to the initiator storage system; and
   copying at least a portion of data from the second viewable snapshot.

3. The method of claim 2, further comprising:
   identifying at least one difference between the first viewable snapshot and the second viewable snapshot;
   creating a list that outlines the identified at least one difference; and
   updating the copy of the snapshot from the first viewable snapshot to the second viewable snapshot by optionally referencing the differences outlined in the list.

4. The method of claim 2, wherein the third and fourth commands are sent a predetermined time after the first and second commands are sent.

5. The method of claim 1, further comprising the initiator storage system taking a snapshot of the copied data.

6. The method of claim 1, further comprising identifying when the first snapshot was taken and time stamping the first snapshot with the identified time.

7. The method of claim 1, wherein at least one of the first and second command comprise a small computer systems interface (SCSI) command.

8. An electronic data system, comprising:
   a target data storage system; and
   an initiator data storage system, wherein the initiator data storage system sends a first command to the target data storage system requesting the target data storage system to take a first snapshot of data stored on the target data storage system, sends a second command to the target data storage system requesting the target data storage system to make the first snapshot viewable to the initiator data storage system, and copies at least a portion of data from the first viewable snapshot.

9. The system of claim 8, wherein the initiator data storage system sends a third command to the target data storage system requesting the target data storage system to take a second snapshot of data stored on the target data storage system, sends a fourth command to the target data storage system requesting the target data storage system to make the second snapshot viewable to the initiator data storage system, and copies at least a portion of data from the second viewable snapshot.

10. The system of claim 9, wherein the target data storage system identifies at least one difference between the first viewable snapshot and the second viewable snapshot, creates a list that outlines the identified at least one difference, and presents the list to the initiator data storage system, and wherein the initiator data storage system updates the copy of the snapshot from the first viewable snapshot to the second viewable snapshot.

11. The system of claim 9, wherein the third and fourth commands are sent a predetermined time after the first and second commands are sent.

12. The system of claim 8, wherein the target data storage system identifies when the first snapshot was taken and time stamp the first snapshot with the identified time.

13. The system of claim 8, wherein the second command comprises a command to map the first snapshot to a logical unit numbers (LUN) and to make the LUN visible to the initiator data storage system.

14. The system of claim 8, wherein the initiator data storage system sends a command to the target data storage system requesting the target data storage system to determine changes that have occurred since the previous snapshot was taken, sends a command to the target data storage system requesting the target data storage system to make the changes visible to the initiator data storage system, and copies the changes that have occurred since the previous snapshot was taken.

15. A device for use in conjunction with data storage, comprising:
   an interface for communicating with a target storage system; and
   a processor, wherein the processor generates a first command for transmission to the target storage system requesting the target storage system to take a first snapshot of data stored on the target storage system, generates a second command for transmission to the target data storage system requesting the target data storage system to make the first snapshot viewable, and copies at least a portion of data from the first viewable snapshot.

16. The device of claim 15, wherein the processor generates a third command for transmission to the target storage system requesting the target storage system to take a second snapshot of data stored on the target storage system, generates a fourth command for transmission to the target storage system requesting the target storage system to make the second snapshot viewable, and copies at least a portion of data from the second viewable snapshot.

17. The device of claim 16, wherein the processor uses a list generated by the target storage system to update the copy of the snapshot, wherein the list outlines at least one difference between the first snapshot and the second snapshot.

18. The device of claim 16, wherein the third and fourth commands are sent a predetermined time after the first and second commands are sent.

19. The device of claim 15, wherein the processor takes a snapshot of the copied data.

20. The device of claim 15, wherein the processor generates a command for transmission to the target storage system requesting the target storage system to determine changes that have occurred since the previous snapshot was taken, generates a command for transmission to the target storage system requesting the target storage system to make the changes visible, and updates the copied data with the visible changes.

* * * * *